Sept. 15, 1970  R. R. WALSH  3,528,747
TARGET DEVICES FOR VISUAL LOCATION OF AND ALIGNMENT
WITH LASER BEAMS AND THE LIKE
Filed April 19, 1968

INVENTOR
ROBERT R. WALSH
BY Birch & Birch
ATTORNEY

United States Patent Office 3,528,747
Patented Sept. 15, 1970

3,528,747
TARGET DEVICES FOR VISUAL LOCATION OF AND ALIGNMENT WITH LASER BEAMS AND THE LIKE
Robert R. Walsh, Wilmington, Del., assignor to Technidyne, Inc., Wilmington, Del., a corporation of Delaware
Filed Apr. 19, 1968, Ser. No. 722,655
Int. Cl. G01b *11/27;* G01c *15/00*
U.S. Cl. 356—154                    11 Claims

ABSTRACT OF THE DISCLOSURE

Target structures are provided for detecting and indicating the impingement thereon of a laser beam and effecting the location of remote points in space of predetermined parametric relationship to an established laser beam. These targets include screen and projection systems for visual indication of a targeted beam condition at points along the laser beam, such systems including a light shield, a screen in the shield for initially receiving the beam and an angular projection mirror behind the screen for visually transmitting the position of the beam on the screen to a remote point from the target. A central lens on the screen is provided such that substantially exact alignment of a target and an associated mounting device can be effected relative to the laser beam. The mounting device is calibrated for the location of points remote from the established laser beam and in particular, points which are plumb with respect thereto.

---

This invention relates to sensing and readout means for detecting and indicating the presence of an established laser beam in space and, more particularly, to visually readable target structures and mounting means for same for effecting the location of points in space from an established laser beam reference.

In daylight outdoor environments, the high ambient lighting is substantially preclusive of visually sighting an established light line in space comprising a laser beam from relatively low-powered gas laser devices.

Where accurate determination of points with respect to such a reference laser beam is desired, it is often necessary to target, i.e., impinge, the fixed laser beam on a target means placed in its path and effect a visual readout of the targeted condition by utilizing the "red glow" or resulting scattered light from the laser beam which has engaged an obstacle such as the surface of a target device.

It is, therefore, an object of this invention to provide a new and novel target and readout structure for effecting accurate alignment with a laser beam established in space.

Another object of this invention is to provide a new and novel target means mounted on an elongated standard which includes optical means effecting perpendicular orientation of said standard with said laser beam.

Another object of this invention is to provide a new and novel target and visual readout structure for effecting accurate alignment with a laser beam established in space and wherein a targeted (impinged) condition of said laser beam on said structure is visible in high levels of ambient light.

Yet another object of this invention is to provide a new and novel target means mounted on an elongated standard which includes optical means effecting perpendicular orientation of said standard with said laser beam; and which effects the accurate location of ground points and the like plumb with and a predetermined distance from said laser beam.

These and other objects of this invention will become more fully apparent with reference to the following specification and drawings which relate to a preferred embodiment of the invention.

Figure 1:
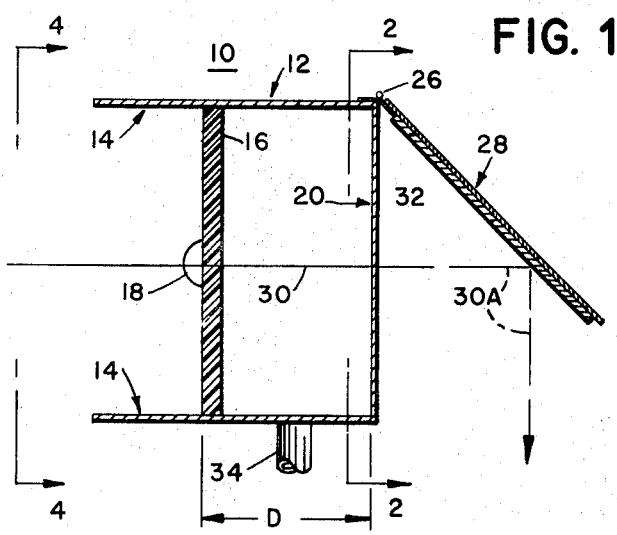
Figure 2:
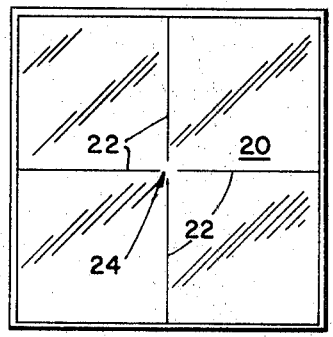
Figure 3:
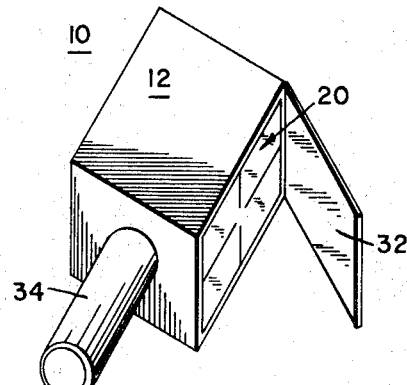
Figure 5:
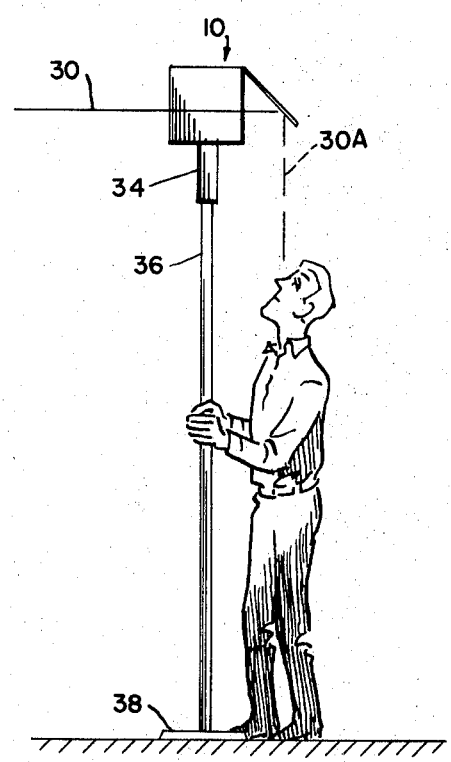
Figure 4:
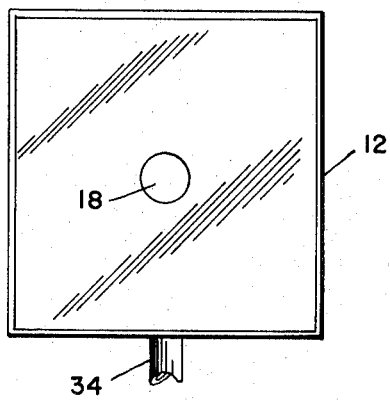

In the drawings:
FIG. 1 is a side elevation of a target structure of the invention in cross-section;
FIG. 2 is a cross-section taken along line 2—2 of FIG. 1;
FIG. 3 is a bottom perspective of the target structure of FIGS. 1 and 2;
FIG. 4 is a front plan view of the target structure of FIGS. 1, 2 and 3; and
FIG. 5 is a schematic of the target structure of the invention mounted on an elongated vertical standard or storey pole.

Referring in detail to the drawings, and more particularly with joint reference to FIGS. 1, 2, 3 and 4, the target structure 10 is shown as including an elongated, generally rectangular, light impervious housing 12.

The forward end of the housing 12 comprises a hollow extended light shield 14 behind which is mounted a first partition or obverse screen 16 of a transparent material having a plano-convex target lens 18 externally superimposed on the center thereof. The rear end of the housing 12 is comprised of a second partition or target screen of lenticular or translucent material which, as clearly shown in FIGS. 2 and 3, is provided with target cross-hairs 22 which converge about a centered target area 24 on the translucent second partition 20.

Mounted on the upper rear edge 26 of the housing 12 is a mounting plate 28 which is placed at a predetermined acute angle with the horizontal axis extending through the centers of the target lens 18 and centered target area 24. This axis is shown as a laser beam 30 for purposes of ultimate description herein of the operation of the invention. The particular angle illustrated is one of forty-five degrees (45°).

The underside of the mounting plate 28 comprises a mirrrored surface 32 which reflects the image of the cross-hairs 22, target area 24 and point of impingement, if any, of a laser beam 30 on the target screen 20 downward as indicated by the dotted line portions 30A of the laser beam 30.

A mounting socket 34, in the form of a tubular extension, is integrally mounted on and extended from the lower surface of the target housing 12 and is adapted to internally receive an elongated standard or storey pole 36 as shown in FIG. 5.

As shown in FIG. 1, the obverse screen 16 and the target screen 20 are mounted mutually parallel, parallel to the axis of the target mounting socket 34 and spaced so that the front surfaces of each are displaced a distance $d$ which is equal to the focal length of the target lens 18.

Referring further to FIG. 5, the storey pole 36 is shown as including a reference or foot portion 38 at the lower extremity thereof and further comprises an extensible device which may be selectively varied in length to effect predetermined displacements of the foot 38 from the target area 24.

An operator 40 is schematically shown handling the storey pole 36 and its mounted target 10.

The storey pole 36 is provided with a horizontal bubble level or the like to vertically orient the storey pole with a horizontal line running into and out of the surface of the drawing. The orientation of the storey pole 36 at right angles to the laser beam 30 is effected by the target means 10 as will now be described.

In operation, referring to FIGS. 1 through 5, and assuming the established condition of the laser beam 30, the operator 40 extends the target means 10 on the end of the storey pole 36 into the approximate path of the laser beam 30.

When the target means 10 is generally positioned in the path of the laser beam 30, the said beam passes into the light shield 14 of the target housing 12, through the transparent obverse screen 16 and impinges against the translucent or lenticular target screen 20. The target screen 20 causes a scattering of the coherent light of the laser beam 30 resulting in the generation of a red glow or spot on the target screen 20 which is transmitted to the mirror 32 and thence to the operator 40 as the dotted line portion 30A of the once coherent laser beam.

The scattering effect of the translucent or lenticular target screen 20 renders the otherwise harmful laser beam safe for viewing with the human eye.

Since the cross-hairs 22 and center target area 24 are reflected on the viewing mirror surface 32, the operator 40 is visually provided with an image of the relative position of the laser beam 30 on the target screen 20 and the center target area 24.

The storey pole 36 can then be moved such that the laser beam 30 and the target lens 18 are merged.

Now, unless the storey pole is at right angles with the laser beam 30, the image presented by the impingement of the laser beam 30 on the target lens 18, superimposed on the image of the target screen 20 and cross-hairs 22 on the mirror surface 32, will be a spot emitting a red glow that is off-center with respect to the image of the center target area 24.

Then, by selectively canting the storey pole 36, the spot can be aligned with the image of the center target area 24, and will become a focused spot with a relatively intensified red glow, bright enough to be easily seen in high ambient light and yet safe for direct viewing, thereby effecting a perpendicular orientation of the storey pole 36 and target mounting 34 with the laser beam 30.

This obviates the need for complex devices such as orthogonally related bubble levels and the like on the storey pole 36.

Now, by the present invention, only a simple one-coordinate level indicating means or a plumb bob is needed since the storey pole 36 may be "swung" on the laser beam 30 as the axis of rotation when the laser beam 30 is targeted on the target lens 18 and target area 24, whereby the storey pole 36 will sweep through a plane perpendicular to the laser beam 30.

As can be seen from the foregoing description, the present invention provides a new and novel target means and point locating means for use in conjunction with beams of coherent light, laser beams, established in predetermined orientations in space.

Without further description it is believed that the advantages of the present invention over the prior art is apparent and while only several preferred embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. Target means detecting and indicating the presence of a laser beam propagated in space comprising optical means, for placement in the path of a laser beam, having a defined optical path therein for receiving and transmitting a laser beam from its path of propagation to a predetermined point of observation; wherein said optical means comprises a housing, a transparent partition adjacent the beam receiving end of said housing; a translucent target surface comprising a second partition at the opposite end of said housing and parallel with said transparent partition; viewing mirror means on said housing adjacent said target surface and oriented at an acute angle with reference to said target surface to thereby divert the reflected image thereon of said target surface and the impingement of a laser beam on said target surface to said point of observation; and cooperating reference means on said transparent partition and said target surface constraining said transparent and second partitions to be oriented perpendicular to said laser beam when said beam is simultaneously impinged thereon; said cooperating reference means comprising convergent lens means on said transparent partition and a defined target area on said target surface in preselected alignment therewith such that said convergent lens means focuses a laser beam impinging thereon upon said defined target area when said transparent and second partitions are mutually perpendicular to said laser beam.

2. The invention defined in claim 1, wherein said housing includes light shield means extending outwardly from and substantially surrounding said transparent partition.

3. The invention defined in claim 1, wherein said target means further includes mounting means mutually parallel with said transparent and second partitions.

4. The invention defined in claim 1, wherein said transparent and second partitions are spaced apart in said housing a distance substantially equal to the focal length of said convergent lens means.

5. The invention defined in claim 1, wherein said defined target area comprises visual reference indicia superimposed on said translucent target surface in a predetermined configuration.

6. The invention defined in claim 1, wherein said transparent and second partitions are spaced apart in said housing a distance substantially equal to the focal length of said convergent lens means; and wherein said defined target area comprises visual reference indicia superimposed on said translucent target surface in a predetermined configuration.

7. The invention defined in claim 3, wherein said transparent and second partitions are spaced apart in said housing a distance substantially equal to the focal length of said convergent lens means; and wherein said defined target area comprises visual reference indicia superimposed on said translucent target surface in a predetermined configuration.

8. The invention defined in claim 3, wherein said mounting means comprises an elongated, calibrated, storey pole means effecting the location of points in space along lines perpendicular to a laser beam when said transparent and second partitions are perpendicular to such a beam.

9. The invention defined in claim 8, wherein said storey pole means includes means effecting a plumb alignment of said storey pole means with a laser beam previously aligned with said cooperating means.

10. The invention defined in claim 3, wherein said mounting means comprises an elongated, calibrated storey pole means effecting the location of points in space along lines perpendicular to a laser beam when said transparent and second partitions are perpendicular to such a beam; and wherein said transparent and second partitions are spaced apart in said housing a distance substantially equal to the focal length of said convergent lens means; and wherein said defined target area comprises visual reference indicia superimposed on said translucent target surface in a predetermined configuration.

11. The invention defined in claim 10, wherein said storey pole means includes means effecting a plumb alignment of said storey pole means with a laser beam previously aligned with said cooperating means.

References Cited

UNITED STATES PATENTS

| | | | |
|---|---|---|---|
| 2,169,533 | 8/1939 | Kasten | 33—74 |
| 3,279,070 | 10/1966 | Blount et al. | 33—74 |
| 3,314,068 | 4/1967 | Verive | 33—74 |
| 3,321,248 | 5/1967 | Williamson et al. | 356—153 |
| 3,367,031 | 2/1968 | Ward | 33—74 |

FOREIGN PATENTS 28,939  1912  Great Britain.

RONALD L. WIBERT, Primary Examiner

J. ROTHENBERG, Assistant Examiner

U.S. Cl. X.R.

33—74